United States Patent [19]

Hirose et al.

[11] Patent Number: 5,564,835
[45] Date of Patent: Oct. 15, 1996

[54] MOVABLE FASTENING APPARATUS FOR A CYLINDRICAL BALL BEARING

[75] Inventors: Kazuya Hirose, Tokyo; Kusuya Ozaki, Tokorosawa, both of Japan

[73] Assignee: Hihaisuto Seiko Kabushiki Kaisha, Tokyo, Japan

[21] Appl. No.: 316,873

[22] Filed: Oct. 3, 1994

[51] Int. Cl.⁶ .................... F16C 29/06; B25G 3/20; F16B 2/00
[52] U.S. Cl. .................... 384/43; 384/57; 403/370; 403/371
[58] Field of Search .................... 384/43, 57, 59; 403/371, 370

[56] References Cited

U.S. PATENT DOCUMENTS

| | | | |
|---|---|---|---|
| 4,338,036 | 7/1982 | DeLeu | 403/371 X |
| 4,563,106 | 1/1986 | Stiiwe | 403/371 X |
| 5,127,807 | 7/1992 | Eslinger | 403/371 X |
| 5,145,277 | 9/1992 | Fujita et al. | 403/371 X |
| 5,174,680 | 12/1992 | Nakamura et al. | 403/371 X |
| 5,230,567 | 7/1993 | Takeuchi | 384/43 |

Primary Examiner—John Q. Nguyen
Attorney, Agent, or Firm—Townsend & Banta

[57] ABSTRACT

A flanged linear ball bearing is provided with a linearly translocatable flange which can be secured to a flange support. A gap is formed between the flange and the ball bearing proper and an intermediate member is adapted to fit in the gap so as to secure the flange to the outside of the bearing proper. The flange is adapted to be secured to a flange support which extends around the bearing proper.

9 Claims, 5 Drawing Sheets

MOVABLE FASTENING APPARATUS FOR A CYLINDRICAL BALL BEARING

FIELD OF THE INVENTION

The present invention relates in general to a ball bearing, and in particular, to a flanged linear ball bearing which allows the flange to be adjustable in location to improve the degree of freedom in installation.

DESCRIPTION OF RELATED PRIOR ART

The conventional flanged linear ball bearing has the flange fixed at one end or intermediate portion of the bearing proper. As shown in FIGS. 10 and 11, a conventional linear ball bearing is composed of a bearing 2, a cage 5 with plural tracks 4 formed to allow many steel balls 3 to infinitely circulate, and a snap ring 6. At one end of the bearing 2, a flange 7 is formed integrally.

However, in the flanged linear ball bearing 1 with this structure, since the flange is fixed to the bearing proper 2, the linear ball 1 is restricted in terms of where it can be installed, and must be designed always considering where the linear ball bearing 1 is to be installed. Furthermore, the integral form consisting of the bearing proper 2 and the flange 7 requires an advanced processing technique, and does not allow easy processing.

The object of the present invention is to provide a flanged linear ball bearing which allows the flange to be translocated to improve the degree of freedom in installation. Thus, the present invention overcomes the disadvantages of the prior art flanged linear ball bearing.

SUMMARY OF THE INVENTION

The present invention provides for a flanged linear ball bearing which is composed of a bearing, a cage with plural tracks formed to allow steel balls to infinitely circulate, and a flange, said flange being linearly translocatably provided around the bearing proper separately from the bearing proper, the bearing proper being fixed and held by pressure bonding to a support to have the flange installed.

The flanged linear ball bearing can be composed as follows: the flange has through holes formed for screws to be inserted through them; threaded holes are formed in the flange support for screwing the flange to the flange support; a gap formed to be larger according to the approach of the flange support is formed between the flange and the bearing proper; an intermediate member formed to fit this gap is provided so that the flange may be brought into contact with the flange support being guided by the intermediate member; and the flange is pressure-bonded to the flange support by screws for fixing the bearing.

The flange can be linearly translocated on the bearing and pressure-bonded by screws to the flange support being guided by the intermediate member for fixing the bearing. This permits a high degree of freedom in installation.

Examples of the flanged linear ball bearing of the present invention are described below in reference to the attached drawings.

DETAILED DESCRIPTION OF THE INVENTION

FIGS. 1 and 2 show a flanged linear ball bearing 10 which is composed of a cylindrical bearing 11 and a cage 12 inside the cylindrical bearing 11. Cage 12 has plural tracks 14 formed to allow steel balls 13 to infinitely circulate. In the linear ball bearing 10, a flange 15 formed separately from the cylindrical bearing 11 is linearly translocatably installed around the cylindrical bearing 11, and is clamped and fastened to a flange support, described hereinafter, at an optional position of the cylindrical bearing 11 to fix the cylindrical bearing 11.

The fastening structure by the flange 15 in the flanged linear ball bearing 10 is described below. The flange 15 has through holes 16 formed for screws which are used to fasten the flange 15 to the flange support 17. Furthermore, a gap G formed to be larger according to the approach to the flange support 17 is formed between the flange 15 and the bearing proper 11. An intermediate member 18 formed to fit the gap G is provided, and the flange 15 is brought into contact with the flange support 17, being guided by the intermediate member 18. The flange 15 is pressure-bonded to flange support 17 by screws 19 to fix the cylindrical bearing 11 (see FIG. 1).

Moreover, when the flange 15 is pressure-bonded to flange support 17 by screws 19, an O ring 20 may be provided in addition to the intermediate member 18, as shown in FIG. 4. It is also possible to use an elastic part such as a leaf spring, in addition to the O ring 20.

The several embodiments of the forms and structures of the flange 15 and the intermediate member 18 are described below in reference to the various drawings.

The flange can be a circular flange 15, square flange 21 or truncated circular flange 22 (see FIGS. 5, 6 and 7). The inside circular wall diameter of the flange 15 is larger than the outside diameter of the cylindrical bearing 11, and is formed to be larger as it approaches toward the flange support 17.

The intermediate member 18 can be made of an elastically deformable material (synthetic resin, etc.), and is a ring formed to fit in the gap G between flange 15 and the outside circular wall of cylindrical bearing 11. The intermediate member 18 is tapered on its outside circular wall.

Furthermore, intermediate member 18 has plural grooves 23 formed to allow deformation for achieving closer contact when it is clamped by screws 19 between flange 15 and the outside circular wall of cylindrical bearing 11 (see FIGS. 5, 6 and 7). Grooves 23 can be formed alternately on the outside circular wall and/or the inside circular wall, or the grooves can be replaced by recesses or cuts 24 formed alternately on both edges of intermediate member 18 (see FIG. 8).

In the flanged linear ball bearing 10, constructed according to the present invention, to translocate the flange 15, screws 19 are loosened to detach from flange support 17, and intermediate member 18 is pressure-bonded thereto. Then, the cylindrical bearing 11 can be adjusted to any optimum location, and flange 15 can be translocated to any optional position on the cylindrical bearing 11.

If the flange 15 has been translocated to tile desired position, the screws 19 are inserted through the through holes 16 into tile flange support 17, to press the flange 15 against the flange support 17. The intermediate member 18 between the flange 15 and the bearing 11 is gradually deformed by the grooves to achieve closer contact. Thus, flange 15 can be fixed to the cylindrical bearing 11 at an optional position. Therefore, even when the flange support 17 is located at a place where installation of an ordinary bearing would be rejected, the bearing of the present invention allows installation by allowing a change of the relative position between flange 15 and the cylindrical bearing 11.

Consequently, the degree of freedom in installation is remarkably higher for the flanged linear ball bearings of the present invention.

The flanged linear ball bearing of the present invention has been described above in reference to several embodiments. However, the present invention can also be applied to a flanged linear ball bearing 30 having a long cylindrical bearing as shown in FIG. 9. In this case, the flanged linear ball bearing 30 has two translocatable flanges 15 to hold and fix the cylindrical bearing 31. Also, in this case, irrespective of the relative position of the two flange supports 32, the flanges 15 can be clamped and fastened to the flange supports 32.

As described above, the present invention allows the flange to be translocated to an optional position of the bearing to fix the bearing. Therefore, the degree of freedom in installation is higher.

Figure 1:
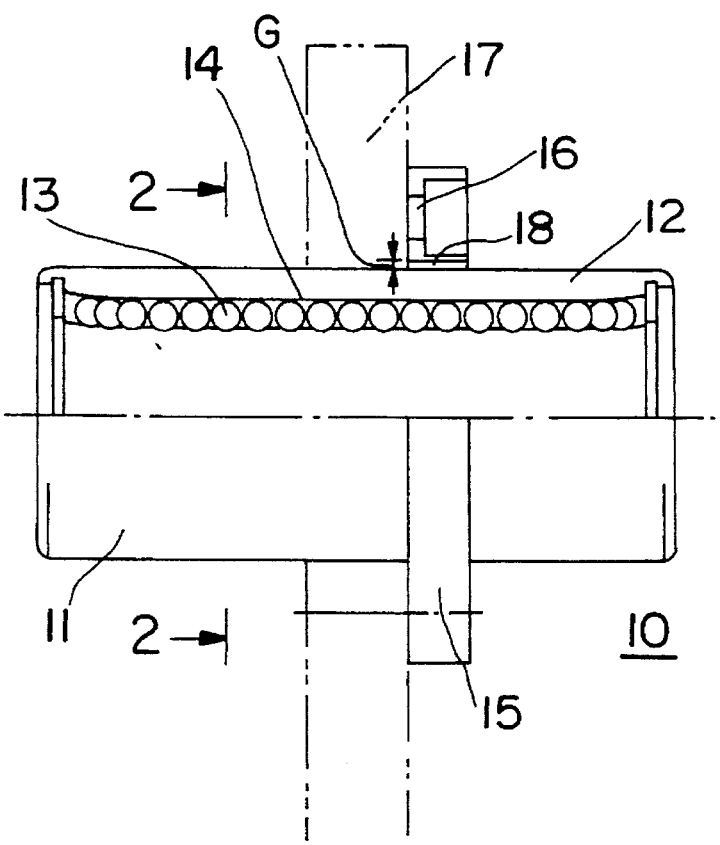
FIG. 1 is a partial vertical sectional view showing one embodiment of the flanged linear ball bearing of the present invention.
Figure 2:
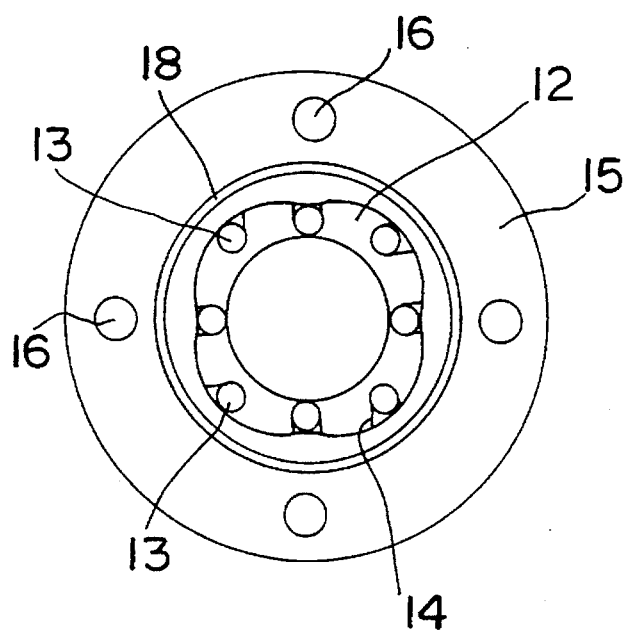
FIG. 2 is a sectional view taken along line 2—2 of FIG. 1.
Figure 3:
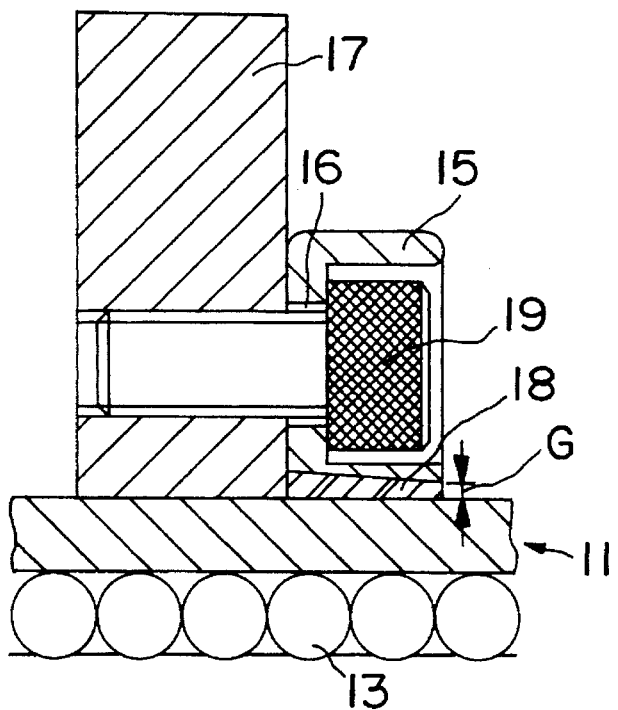
FIG. 3 is an expanded sectional view of a portion of the structure for fixing the bearing by the flange of the flanged linear ball bearing of FIG. 1.
Figure 4:
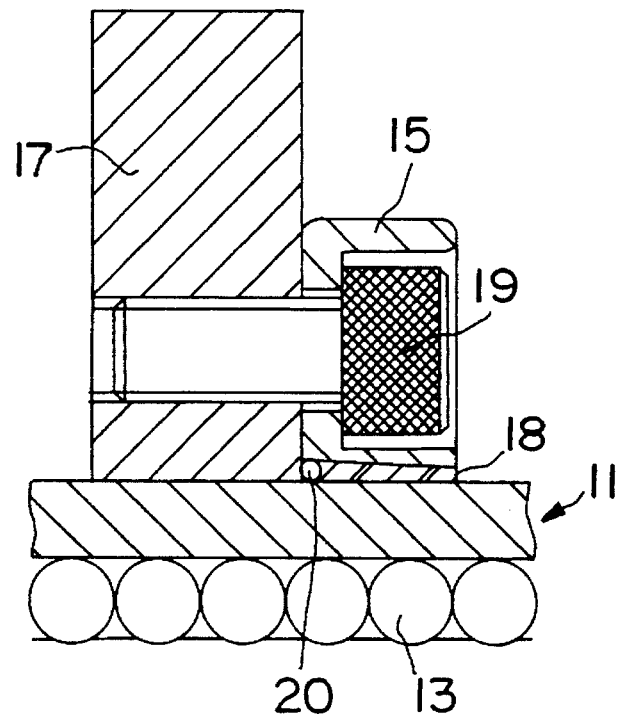
FIG. 4 is an expanded sectional view of a portion of the structure for fixing the bearing by the flanged of the flanged linear ball bearing of FIG. 1.
Figure 5:
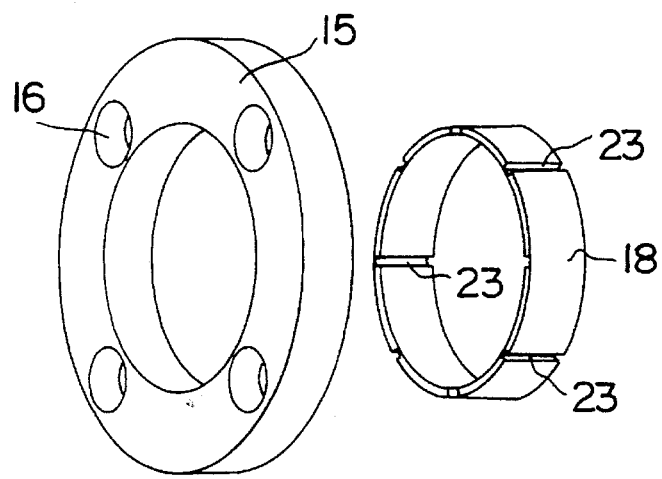
FIG. 5 is a perspective view showing the flange and the intermediate member applied to the flanged linear ball bearing of FIG. 1.
Figure 6:
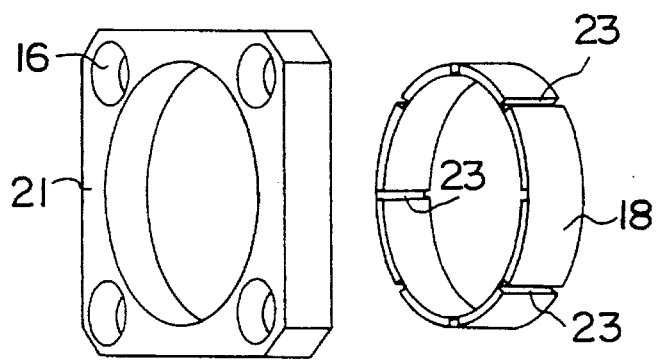
FIG. 6 is a perspective view showing another embodiment of the flange and the intermediate member applied to the flanged linear ball bearing of FIG. 1.
Figure 7:
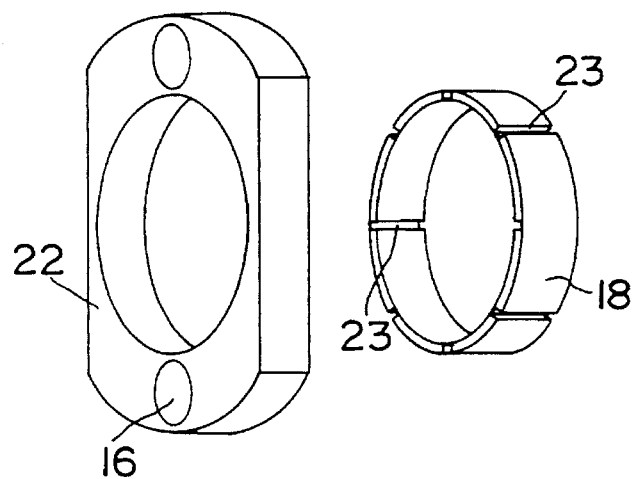
FIG. 7 is a perspective view showing another embodiment of the flange and the intermediate member applied to the flanged linear ball bearing of FIG. 1.
Figure 8:
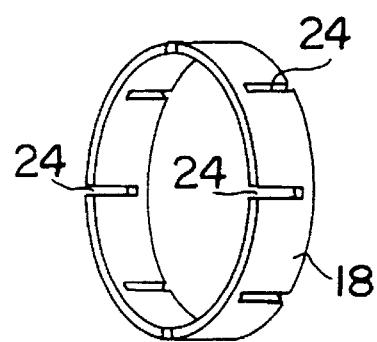
FIG. 8 is a perspective view showing another embodiment of the intermediate member applied to the flanged linear ball bearing of FIG. 1.
Figure 9:
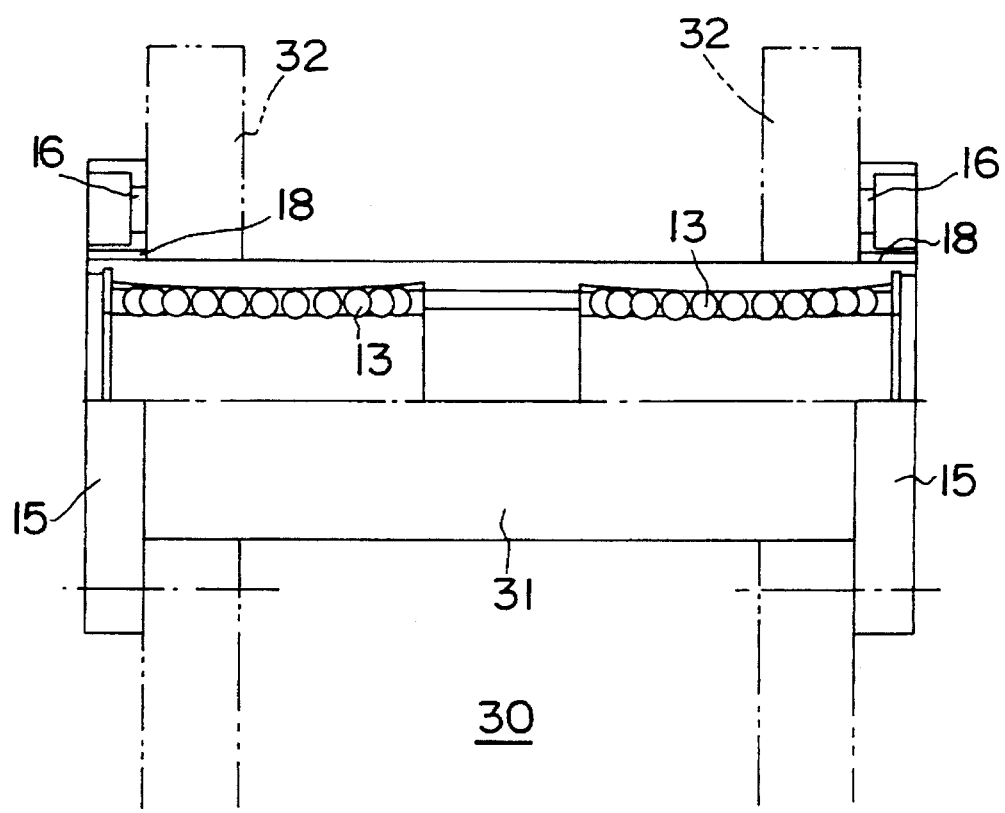
FIG. 9 is an illustration with a partial vertical sectional view of another embodiment of the flanged linear ball bearing of the present invention.
Figure 10:
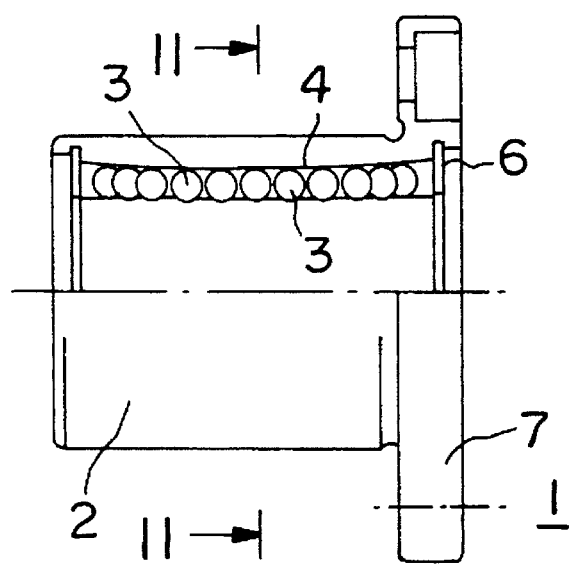
FIG. 10 is an illustration with a partial sectional view showing a conventional flanged linear ball bearing.
Figure 11:
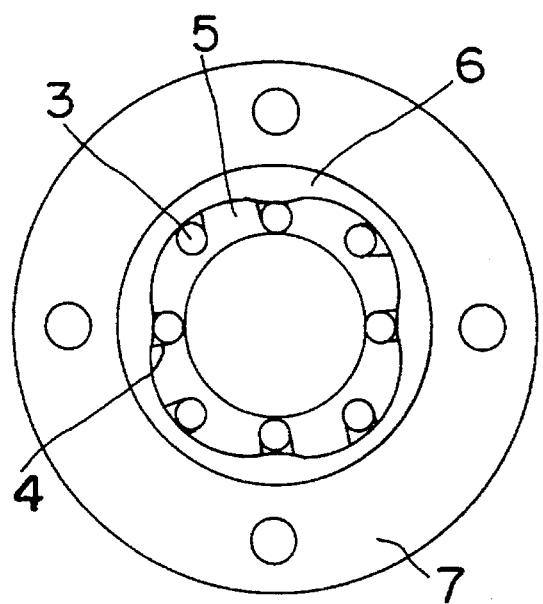
FIG. 11 is a sectional view taken along line 11—11 of FIG. 10.

What is claimed is:

1. A combination of a linear ball bearing and a linearly translocatable fastening apparatus attaching said linear ball bearing to a flange support comprising:

(a) a cylindrical ball bearing body,
a cage inside said ball bearing body with a plurality of recirculating tracks formed to allow steel balls to infinitely circulate, and
a snap ring to fixedly attach said cage in said ball bearing body;

(b) said flange support having a cylindrical hole or bore only slightly larger than an outer periphery of said ball bearing body so that in a fastened position the ball bearing body fits at least partially in the bore of said flange support, said flange support having a plurality of threaded holes therein;

(c) a flange having a circular tapered hole or bore in its center which is slightly larger than an outer periphery of said cylindrical ball bearing body, said tapered bore in the flange having a larger diameter adjacent said flange support when it is secured to said flange support, said flange having a plurality of non-threaded holes around its periphery which correspond to the position of said threaded holes in said flange support, whereby bolts can be inserted through said non-threaded holes to secure the flange to said flange support;

(d) an intermediate ring-shaped member having a cylindrical inner peripheral surface fitted around the cylindrical body of the ball bearing and a tapered outer peripheral surface complimentary to the tapered inner periphery of the circular tapered bore of the flange, the tapered surface of the intermediate member having a larger diameter nearest said flange support when the intermediate member is secured between said flange and said outer peripheral surface of said ball bearing body, said intermediate member being formed of an elastically deformable material and having a plurality of axially extending grooves or cuts to allow deformation of the intermediate member when it is clamped between the flange and the ball bearing.

2. The combination of a linear ball bearing and a linearly translocatable fastening apparatus attaching said linear ball bearing to a flange support of claim 1, wherein said flange has a plurality of circular recesses at said non-threaded holes, respectively, so as to receive respective heads of bolts extending through said flange and into said flange support.

3. The combination of a linear ball bearing and a linearly translocatable fastening apparatus attaching said linear ball bearing to a flange support of claim 1, wherein said intermediate member has an axial length corresponding to an axial thickness of said flange at the cylindrical bore of said flange.

4. The combination of a linear ball bearing and a linearly translocatable fastening apparatus attaching said linear ball bearing to a flange support of claim 1, wherein said intermediate member has an axial length smaller than an axial thickness of said flange at the cylindrical bore of said flange.

5. The combination of a linear ball bearing and a linearly translocatable fastening apparatus attaching said linear ball bearing to a flange support of claim 4, wherein an O ring is provided between an outer periphery of said ball bearing body and an inner periphery of said bore in the flange.

6. The combination of a linear ball bearing and a linearly translocatable fastening apparatus attaching said linear ball bearing to a flange support of claim 5, wherein the O ring is provided between said flange support and said intermediate member.

7. The combination of a linear ball bearing and a linearly translocatable fastening apparatus attaching said linear ball bearing to a flange support of claim 1, wherein said intermediate member has grooves or cuts on said tapered outer surface.

8. The combination of a linear ball bearing and a linearly translocatable fastening apparatus attaching said linear ball bearing to a flange support of claim 1, wherein the intermediate member has grooves or cuts on said inner surface.

9. The combination of a linear ball bearing and a linearly translocatable fastening apparatus attaching said linear ball bearing to a flange support of claim 1, wherein a plurality of said flanges secure said ball bearing body to a plurality of flange supports.

* * * * *